United States Patent
Tsuchiya (10) Patent No.: US 9,180,809 B2
(45) Date of Patent: Nov. 10, 2015

(54) VEHICLE LED LIGHTING DEVICE

(75) Inventor: Yosuke Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 13/982,271

(22) PCT Filed: Feb. 10, 2012

(86) PCT No.: PCT/JP2012/053177
§ 371 (c)(1),
(2), (4) Date: Jul. 29, 2013

(87) PCT Pub. No.: WO2012/111574
PCT Pub. Date: Aug. 23, 2012

(65) Prior Publication Data
US 2013/0307411 A1   Nov. 21, 2013

(30) Foreign Application Priority Data

Feb. 16, 2011 (JP) .................................. 2011-030821

(51) Int. Cl.
*B60Q 1/26* (2006.01)
*B60Q 11/00* (2006.01)
*H05B 33/08* (2006.01)

(52) U.S. Cl.
CPC ............... *B60Q 1/26* (2013.01); *B60Q 1/2696* (2013.01); *B60Q 11/005* (2013.01); *H05B 33/083* (2013.01); *H05B 33/0809* (2013.01); *H05B 33/0815* (2013.01); *H05B 33/0821* (2013.01); *H05B 33/0827* (2013.01)

(58) Field of Classification Search
None
See application file for complete search history.

(56) References Cited

U.S. PATENT DOCUMENTS

| 7,843,150 | B2 * | 11/2010 | Wang et al. ................... 315/307 |
| 8,733,947 | B2 * | 5/2014 | Yanase et al. ................... 353/85 |
| 8,928,231 | B2 * | 1/2015 | Campos et al. ............... 315/122 |
| 2010/0201283 | A1 * | 8/2010 | Kawata et al. ................ 315/287 |
| 2011/0037407 | A1 * | 2/2011 | Ahn et al. ...................... 315/287 |

(Continued)

FOREIGN PATENT DOCUMENTS

| JP | 4459147 B2 | 4/2007 |
| JP | 2009-241665 | 10/2009 |

(Continued)

OTHER PUBLICATIONS

International Search Report for corresponding International Application No. PCT/JP2012/053177, May 15, 2012.

*Primary Examiner* — Tuan T Lam
(74) *Attorney, Agent, or Firm* — Mori & Ward, LLP (57) ABSTRACT

A vehicle LED lighting device includes a drive control means 51 includes an abnormality detection means 60 detecting a disconnection or short-circuit abnormality of the LED lamp, the abnormality detection means 60 includes a current detection unit 61 detecting the value of a current flowing through the LED lamps 20 and 30 when the LED lamps 20 and 30 are driven by the drive control means 51, a comparison unit 62 comparing the current value detected by the current detection unit 61 with a predetermined abnormality determination value, and a determination value switching unit 63 switching the abnormality determination value in accordance with variation of a power supply voltage of the vehicle, and whether or not there is the disconnection or short-circuit abnormality is judged based on the abnormality determination value switched by the determination value switching unit 63 and the detected current value.

10 Claims, 7 Drawing Sheets

(56) References Cited

U.S. PATENT DOCUMENTS

| | | | |
|---|---|---|---|
| 2011/0043114 A1* | 2/2011 | Hsu et al. | 315/119 |
| 2011/0273282 A1 | 11/2011 | Ohsawa | |
| 2012/0071845 A1* | 3/2012 | Hu et al. | 604/319 |
| 2013/0293133 A1* | 11/2013 | MIN et al. | 315/210 |
| 2014/0015409 A1* | 1/2014 | Tetsuka et al. | 315/77 |

FOREIGN PATENT DOCUMENTS

| | | |
|---|---|---|
| JP | 2009241665 | * 10/2009 |
| WO | 2010/097864 | 9/2010 |

* cited by examiner

VEHICLE LED LIGHTING DEVICE

TECHNICAL FIELD

The present invention relates to a device for detecting a disconnection abnormality or a short-circuit abnormality of an LED lamp installed in a vehicle and particularly relates to a vehicle LED lighting device that detects a disconnection or a short circuit during lighting of the LED lamp.

BACKGROUND ART

As conventional fault detecting devices for detecting a disconnection abnormality or a short-circuit abnormality of a direction indicator lamp or other LED lamp installed in a vehicle, various structures have been proposed as exemplified by Patent Document 1. Such LED lamp fault detecting devices basically determine whether or not there is a disconnection or short-circuit abnormality by detecting a voltage across respective ends of the LED lamp.

CITATION LIST

Patent Documents

Patent Documents 1 Japanese Patent Publication No. 4459147

SUMMARY OF INVENTION

Technical Problem

However, with an LED lamp installed in a vehicle, there is an issue that judgment of a disconnection abnormality or a short-circuit abnormality is difficult because the lamp is driven to be lit by a battery that is charged by a generator during travel and variation of power supply voltage thus occurs readily and determination of disconnection or short circuit must be performed in consideration of fluctuation of the power supply voltage.

Also, the phenomenon that judgment of a disconnection abnormality or short-circuit abnormality by a current value is difficult occurs when a disconnection abnormality or a short-circuit abnormality is judged by the current value because an LED, which is driven at a low current, is not only small in change of current value due to disconnection or short circuit but the current value also varies due to fluctuation of the power supply voltage.

The present invention has been made in view of the above circumstances, and an object thereof is to provide a vehicle lamp, with which judgment of a disconnection abnormality or short-circuit abnormality by detection of a current value can be performed with high precision even if variation occurs in the power supply voltage that drives an LED lamp.

Solution to Problem

To achieve the above object, the present invention of the claim 1 having a first feature is a vehicle LED lighting device comprising a drive control means (51) performing drive control of an LED lamp (20, 30) installed in a vehicle, and wherein the drive control means (51) includes an abnormality detection means (60) detecting a disconnection or short-circuit abnormality of the LED lamp (20, 30), the abnormality detection means (60) includes a current detection unit (61) detecting the value of a current flowing through the LED lamp (20, 30) when the LED lamp (20, 30) is driven by the drive control means (51). Furthermore, whether or not there is the disconnection or short-circuit abnormality is judged based on the abnormality determination value switched by the determination value switching unit (63) and the detected current value.

The present invention of the claim 2 having a second feature is the vehicle LED lighting device according to claim 1, wherein as the abnormality determination value, an abnormality determination value for disconnection detection and an abnormality determination value for short-circuit detection are set respectively.

The present invention of the claim 3 having a third feature is the vehicle LED lighting device according to claim 1, wherein the drive control means (51) includes a drive unit (67), which, when a drive operation of the LED lamp (20, 30) is performed by a driver, outputs a pulse signal that is in accordance with the power supply voltage and drives the LED lamp (20, 30) to blink in a manner such that the LED lamp (20, 30) is in a lit state when the pulse signal is in the on state, and the current detection unit (61) detects the current value when the pulse signal is in the on state.

The present invention of the claim 4 having a forth feature is the vehicle LED lighting device according to claim 3, wherein the on state of the pulse signal is arranged from a cluster of a plurality of short pulses that are set to a predetermined duty ratio and the current detection unit (61) detects the current value at a timing at which the first short pulse, among the plurality of short pulses in the first on state of the pulse signal output in accordance with the drive operation of the LED lamp (20, 30), is on.

The present invention of the claim 5 having a fifth feature is the vehicle LED lighting device according to claim 4, wherein the current detection unit (61) detects the current value at timings at which a predetermined number of short pulses, including the first short pulse, are on.

The present invention of the claim 6 having a sixth feature is the vehicle LED lighting device according to claim 4 or 5, wherein the drive unit (67) changes the duty ratio of the short pulse in accordance with the power supply voltage applied to the LED lamp (20, 30).

The present invention of the claim 7 having a seventh feature is the vehicle LED lighting device according to claim 6, wherein the duty ratio of the short pulse is set to decrease as the power supply voltage applied to the LED lamp (20, 30) increases.

The present invention of the claim 8 having a eighth feature is the vehicle LED lighting device according to any one of claims 1 to 7, wherein, in regard to the abnormality determination value for short-circuit detection, the abnormality determination value includes a first abnormality determination value that changes in accordance with the power supply voltage applied to the LED lamp (20, 30) and a second abnormality determination value that is greater than the first abnormality determination value and is a fixed value.

The present invention of the claim 9 having a ninth feature is the vehicle LED lighting device according to claim 8, wherein an indicator display unit (58, 59) that blinks in accordance with the blinking state of the LED lamp (20, 30) is included inside a meter and the LED lamp (20, 30) and the indicator display unit (58, 59) are connected to the drive control means (51) through separate lines.

The present invention of the claim 10 having a tenth feature is the vehicle LED lighting device according to claim 8 or 9, wherein the indicator display unit (58, 59) that blinks in accordance with the blinking state of the LED lamp (20, 30) is formed inside a meter of the vehicle, the LED lamp (20, 30) and the indicator display unit (58, 59) are driven with the blinking cycle being quickened in comparison to the blinking cycle in the normal state when the detected current value is greater than the first abnormality determination value and less than the second abnormality determination value, and the LED lamp (20, 30) is unlit and the indicator display unit (58, 59) is driven with the blinking cycle being quickened in comparison to the blinking cycle in the normal state when the detected current value is greater than the second abnormality determination value.

Advantageous Effects of Invention

With the arrangement of the first aspect, the determination value for disconnection/short-circuit abnormality detection is switched in accordance with the power supply voltage so that the disconnection/short-circuit abnormality can be determined with good precision from a change of the current value detected by the current detection unit (61) even with the vehicle-installed LED lamp (20, 30) with which the power supply voltage fluctuates readily.

With the arrangement of the second aspect, the disconnection abnormality and the short-circuit abnormality can respectively be detected with good precision and, for example, a drive mode of the LED lamp (20, 30) can be made to differ between when the disconnection occurs and when the short circuit occurs.

With the arrangement of the third aspect, whether or not there is an abnormality is judged at the timing of the on state of the pulse signal, which is the timing at which the LED lamp (20, 30) is lit, and wasteful power consumption can thus be prevented because the judgment of whether or not there is an abnormality can be performed together with the driving of the lamp (the judgment of whether or not there is an abnormality is not performed when the lamp is unlit).

With the arrangement of the fourth aspect, when the disconnection or short-circuit abnormality occurs in the LED lamp (20, 30), the abnormality can be detected rapidly in the initial state even in the first on state.

With the arrangement of the fifth aspect, the precision of judgment of whether or not there is a disconnection abnormality or a short-circuit abnormality can be improved.

With the arrangement of the sixth aspect, by changing the duty ratio of the short pulse in accordance with the power supply voltage, for example, the detected current value can be made fixed readily regardless of the magnitude of the power supply voltage to enable the judgment of whether or not an abnormality is detected to be made readily.

With the arrangement of the seventh aspect, the increase of the current value in accordance with the increase of the power supply voltage can be suppressed by decreasing the duty ratio of the short pulse to thereby stabilize the current value.

In particular, when judging whether or not there is a disconnection abnormality, the normal and disconnection current values can be made to differ largely from the disconnection abnormality determination value to thereby enable improvement of the precision of determination.

Also, in judging whether or not there is a short-circuit abnormality, a large short-circuit current can be prevented from flowing through the LED lamp (20, 30) even in a state where the short-circuit abnormality is occurring.

With the arrangement of the eighth aspect, in a case where the LED lamp (20, 30) is arranged from a plurality of LED's, a short-circuit abnormality in which a comparatively small short-circuit current flows, as when a single LED among the plurality of LED's is short-circuited, and a short-circuit abnormality in which a comparatively large short-circuit current flows, as when all of the LED's are short-circuited, can be detected distinguishingly.

With the arrangement of the ninth aspect, the driving of the LED lamp (20, 30) and the driving of the indicator display unit (58, 59) are performed in separate lines (two lines) so that the driving of the indicator display unit (58, 59) can be prevented from affecting the judgment of whether or not there is a disconnection or short-circuit abnormality in the LED lamp.

With the arrangement of the tenth aspect, when the current value is that of a small short-circuit current that is greater than the first abnormality determination value and less than the second abnormality determination value, a large load is unlikely to be applied to the LED lamp (20, 30) and the LED lamp (20, 30) can thus be driven to blink with the blinking cycle being quickened to enable the proper function as a lamp to be achieved while quickening the blinking cycle of the indicator display unit (58, 59) to notify a user.

Also, when the current value is that of a large short-circuit current value that is greater than the second abnormality determination value, the LED lamp (20, 30) can be unlit immediately to avoid application of a load on the LED and meanwhile the blinking cycle of the indicator display unit (58, 59) can be quickened to notify the user of the abnormality.

BRIEF DESCRIPTION OF DRAWINGS

FIG. 5 shows graphs for preparing abnormality detection value setting maps stored in the winker control unit, with FIG. 5A being a disconnection judgment map and FIG. 5B being a short-circuit judgment map.

FIG. 8 shows graphs for preparing abnormality detection value setting maps in a case where the duty ratio is variable, with FIG. 8A being a disconnection judgment map and FIG. 8B being a short-circuit judgment map.

DESCRIPTION OF EMBODIMENTS

Figure 1:
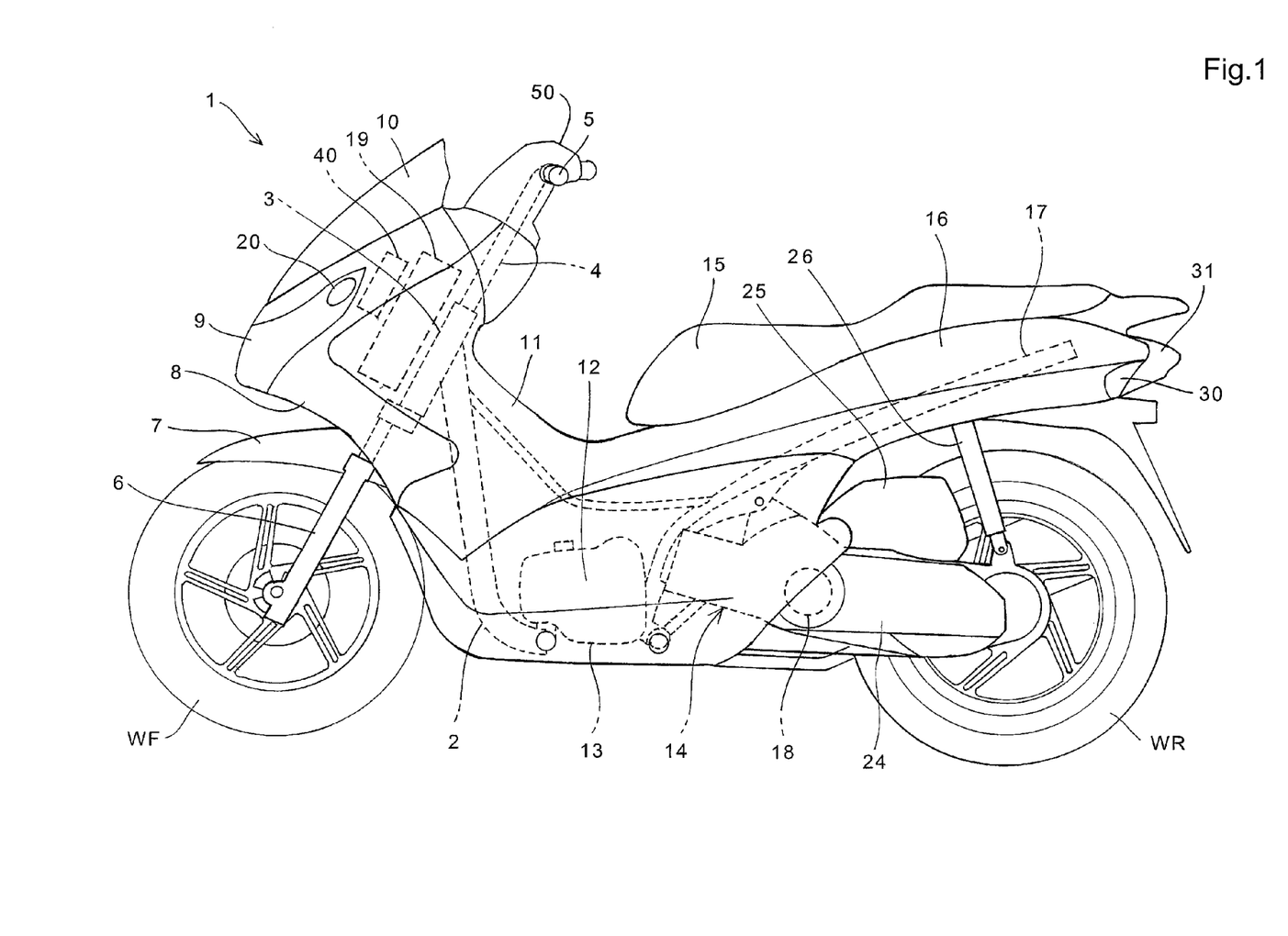
FIG. 1 is a side view of a motorcycle in which a vehicle lighting device according to the present invention is installed.

A preferred embodiment of the present invention shall now be described with reference to the drawings. FIG. 1 is a side view of a motorcycle 1 in which a vehicle lighting device according to the embodiment of the present invention is applied.

The motorcycle 1 is a scooter-type vehicle provided with a low deck floor 12, on which the legs of a rider are placed, at right and left sides in the vehicle width direction of a straddle portion 11 extending in the vehicle body front/rear direction. A head pipe 3, pivotally supporting a steering stem 4 in a rotatable manner, is coupled to a front end portion of a vehicle frame 2. A pair of right and left steering handles 5 are mounted on an upper portion of the steering stem 4. A meter unit 50, in which are disposed a speedometer, a fuel gauge, a trip meter, and various indicators for making a driver visually recognize various information, is provided at a central position of the steering handles 5. A pair of right and left front forks 6 (of which that of just one side is shown), pivotally supporting a front wheel WF in a rotatable manner, are mounted on a lower portion of the steering stem 4. A front fender 7 covering the front wheel WF is mounted on the front fork 6.

A battery 19 supplying electric power to accessories as power loads and an ECU 40 controlling an ignition device, fuel injection device, etc., of an engine are provided in front of the head pipe 3. A headlight 9 and a wind screen 10 are mounted on a front cowl 8 that is formed so as to cover the battery 19 and the ECU 40. Front winkers 20 are provided in interiors of both ends in the vehicle width direction of the head light 9.

A rear frame 17, supporting a seat cowl 16 and a seat 15, is coupled to a rear end portion of the vehicle body frame 2. Right and left rear winkers 30 and a tail lamp 31, positioned at a center of the winkers, are provided at a rear end of the vehicle.

A fuel tank 13 is provided in the interior of the straddle portion 11 so as to cover the vehicle body frame 2 from above. A unit swing type power unit 14, which pivotally supports a rear wheel WR in a rotatable manner, is mounted behind the fuel tank 13. A transmission case 24, in which a belt-type continuously variable transmission is internally provided, is integrally provided at a rear portion of the power unit 14, and an air cleaner box 25 is mounted on an upper portion of the transmission case 24. The power unit 14 is pivotally supported in a swingable manner at a front side of the rear frame 17 and is supported so as to be suspended by rear shocks 26 at a rear side of the rear frame 17.

The power unit 14 of the present embodiment includes an ACG starter motor 18 in which is integrated a starter motor starting the engine that is a drive source and a generator generating electricity by the rotational driving force of the engine. Various modifications are possible in regard to the arrangement of the starter motor and the generator and, for example, the starter motor and the generator may be provided as separate, independent units. Also, a hybrid vehicle that uses the ACG motor 18 as an auxiliary motor and uses the engine and the motor in combination during travel may be arranged.

Figure 2:
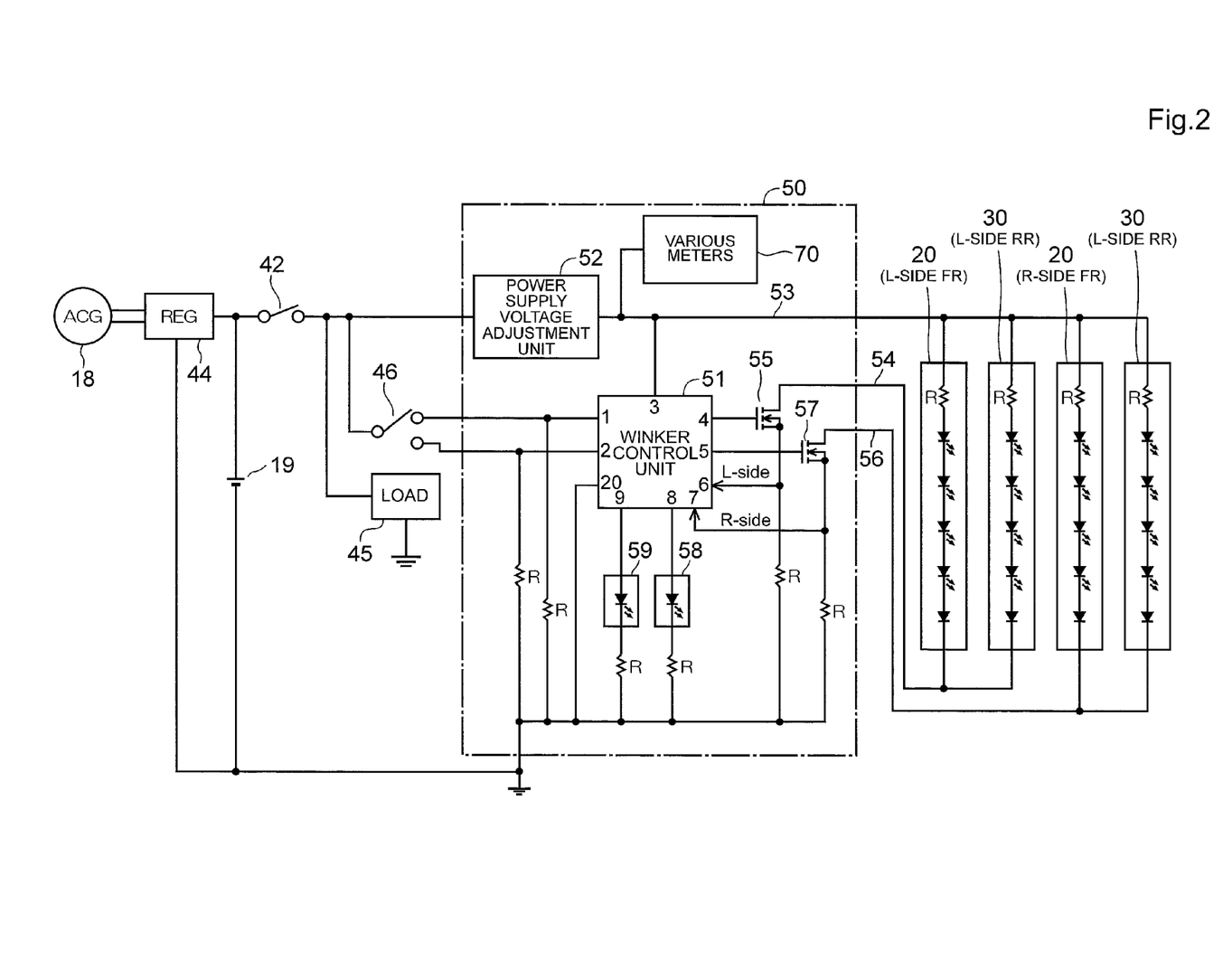
FIG. 2 is an overall arrangement diagram of the vehicle lighting device according to the present invention.

The vehicle LED lighting device according to the embodiment of the present invention shall now be described with reference to FIG. 2. FIG. 2 shows the system arrangement of the entire vehicle lighting device.

A winker control unit (drive control means) 51, controlling the lighting of the front winkers (LED lamps) 20 and the rear winkers (LED lamps) 30, and a power supply voltage adjustment unit 52 are incorporated in the meter unit 50 installed on the vehicle. A power supply voltage from the battery 19 is supplied via a main switch 42 to the supply voltage adjustment unit 52, and the voltage adjustment unit 52 performs output adjustment by cutting the excess voltage and adjusts the voltage in a power supply line 53 to 10 to 16V. The power supply line 53 is connected to one end sides of the respective front winkers 20 and rear winkers 30. The front winkers 20 and rear winkers 30 are arranged from a left front winker 20 (L-side FR), and left rear winker 30 (L-side RR), right front winker 20 (R-side FR) and right rear winker 30 (R-side RR) that respectively correspond to the right and left sides.

The respective winkers 20 and 30 are connected in parallel with respect to the battery 19, the other end sides of the left front winker 20 (L-side FR) and the left rear winker 30 (L-side RR) are connected via a left winker current line 54 to an FET 55, which is a control switch, and the other end sides of the right front winker 20 (R-side FR) and the right rear winker 30 (L-side RR) are connected via a right winker current line 56 to an FET 57, which is a control switch. Each of the front winkers 20 and rear winkers 30 is arranged by connecting a resistor R, four light emitting diodes, and a diode in series.

The FET 55 has a control line connected so that a control signal is supplied from the winker control unit 51 and performs an on/off operation in accordance with the supplying of the signal so that the left front winker 20 (L-side FR) and the left rear winker 30 (L-side RR) respectively undergo a blinking operation simultaneously. Similarly, the FET 57 has a control line connected so that a control signal is supplied from the winker control unit 51 and performs an on/off operation in accordance with the supplying of the signal so that the right front winker 20 (R-side FR) and the right rear winker 30 (R-side RR) respectively undergo a blinking operation simultaneously. The other end side of each of the FET 55 and FET 57 is grounded via a resistor R.

The battery 19 is charged via a regulator 44 from the ACG starter motor (generator) 18 that generates electricity in accordance with travel. Also, the power supply voltage from the battery 19 is supplied via the main switch 42 to various loads 45, such as the headlight, tail lamp, etc. Also, a winker switch 46, by which the driver performs a switching operation in accordance with right and left turning, is connected to the main switch 42. Respective selection terminals of the winker switch 46 are connected to ports 1 and 2 of the winker control unit 51. The power supply voltage from the power supply line 53 is supplied to a port 3 of the winker control unit 51 to drive the winker control unit 51.

A port 4 of the winker control unit 51 is connected to the control line of the FET 55 and a port 5 of the winker control unit 51 is connected to the control line of the FET 57. Also, a port 6 of the winker control unit 51 is connected to the ground side of the FET 55 and a port 7 is connected to the ground side of the FET 57.

A port 8 of the winker control unit 51 is connected to an indicator (indicator display unit) 58 arranged from a light emitting diode that blinks inside the meter unit 50 in accordance with the blinking state of the LED lamps when the right winkers are selected by the winker switch 46. Similarly, a port 9 is connected to an indicator 59 arranged from a light emitting diode that blinks inside the meter unit 50 in accordance with the blinking state of the LED lamps when the left winkers are selected by the winker switch 46. The other end side of each of the indicator 58 and indicator 59 is grounded via a resistor R and is connected to the winker control unit 51 so as to form a separate line with respect to the LED lamps.

By the driving of the FET's 55 and 57 (ports 4 and 5) by the winker control unit 51 and the driving of the indicators 58 and 59 (ports 8 and 9) being performed in separate lines, blinking of the winkers (lamps) 20 and 30 and blinking of the indicators 58 and 59 can be performed at separate cycles.

Therefore, when the driver performs operation of the winker switch 46 (selection of the left winker or selection of the right winker), the winker control unit 51 outputs the control signal (pulse signal) from the port 4 or the port 5 to perform blinking drive in a manner such that the LED lamps 20 and 30 are put in the lit state when the pulse signal is in the on state (the FET 55 or the FET 57 is in the on state) and performs blinking drive of the indicator 58 that is to be lit when the right winkers are selected or the indicator 59 that is to be lit when the left winkers are selected.

Also, the power supply line 53 is connected to various meters 70, such as the speedometer, tachometer, fuel gauge, trip meter, etc., and is arranged to make these operate.

The arrangement of the winker control unit 51 for detecting an abnormality due to a disconnection or a short circuit in regard to the front winkers (LED lamps) 20 and the rear winkers (LED lamps) 30 shall now be described with reference to FIG. 3.

The winker control unit 51 is arranged from an abnormality detection means 60 detecting an abnormality of the front winkers (LED lamps) 20 and the rear winkers (LED lamps) 30, a power supply voltage detection unit 65 detecting the power supply voltage, a SW input detection unit 66 detecting which of the right and left winkers are selected by the winker switch 46, and an LED winker/indicator drive unit (drive unit) 67 controlling the blinking drive of the winkers (LED lamps) 20 and 30 and the blinking drive of the indicators 58 and 59.

The abnormality detection means 60 is arranged from a current detection unit 61 detecting the current flowing through the winkers (LED lamps) 20 and 30, a comparison unit 62 comparing the detected current value and a determination value, a determination value switching unit 63 switching the abnormality determination value with respect to variation of the power supply voltage, and a storage unit 64 storing map data of various values for performing switching of the abnormality determination value.

The current detection unit 61 is arranged to detect the current flowing through each of the left winker current line 54 and the right winker current 56 via the port 6 and the port 7 of the winker control unit 51 to detect the value of the current flowing through each of the right and left winkers (LED lamps) 20 and 30 when the winkers (LED lamps) are driven by the LED winker/indicator drive unit (drive unit) 67 and to output each current value to the comparison unit 62.

The comparison unit 62 compares each current value detected by the current detection unit 61 with the predetermined abnormality determination value set by the abnormality value switching unit 63. As the abnormality determination value, an abnormality determination value for disconnection detection and an abnormality determination value for short-circuit detection are set and judgment of whether or not there is a disconnection abnormality or a short-circuit abnormality can be performed by the comparison. The specific method for judging whether or not there is a disconnection abnormality or a short-circuit abnormality shall be described later.

At the determination value switching unit 63, the power supply voltage detected by the power supply voltage detection unit 65 is input via the LED winker/indicator drive unit (drive unit) 67 and each abnormality determination value is set in accordance with the variation of the power supply voltage applied to the LED lamps. The power supply voltage detected by the power supply voltage detection unit 65 may be input directly into the determination value switching unit 63. The respective abnormality determination values (the disconnection detection abnormality determination value and the short-circuit detection abnormality determination value) are set based on a disconnection map and a short-circuit map stored in advance in the storage unit 64.

In the storage unit 64 are stored the disconnection map for the setting of the disconnection detection abnormality determination value by the determination value switching unit 63 in accordance with the variation of the power supply voltage and the short-circuit map for the setting of the short-circuit detection abnormality determination value by the determination value switching unit 63 in accordance with the variation of the power supply voltage.

The power supply voltage detection unit 65 detects the power supply voltage input from the power supply line 53 via the port 3 of the winker control unit 51.

The SW input detection unit 66 detects the input side selected by the winker switch 46 via the port 1 and the port 2 of the winker control unit 51.

The LED winker/indicator drive unit (drive control means) 67 outputs the control signal to the port 4 or the port 5 of the winker control unit 51 to perform on/off control of the FET 55 or the FET 57 to perform blinking drive of the left winkers (LED lamps) or the right winkers (LED lamps) and controls the blinking drive of the indicator 58 or 59 via the port 8 or the port 9.

Figure 4:
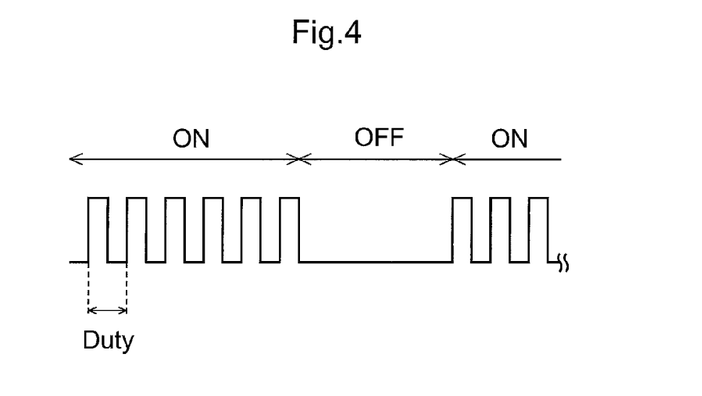
FIG. 4 is a waveform diagram of a control signal output by the winker control unit.

The control signal output to the port 4 or the port 5 by the LED winker/indicator drive unit (drive control means) 67 is arranged as a pulse signal having on and off states as shown in FIG. 4, and the on state of the pulse signal is arranged from a cluster of a plurality of short pulses each set to a predetermined duty ratio (62.5%).

The current detection unit 61 is arranged to detect the current value at a timing at which the first short pulse, among the plurality of short pulses in the first on state of the pulse signal output in accordance with the drive operation of the winkers 20 and 30, is on. The current detection unit 61 detects the current value at timings at which a predetermined number of short pulses, including the first short pulse, are on.

The disconnection map stored in the storage unit 64 for setting the disconnection abnormality detection determination value and the short-circuit map for setting the short-circuit abnormality detection determination value shall now be described with reference to FIG. 5. With the present example, the duty ratio of each of the short pulses making up the control signal of FIG. 4 is fixed at 62.5%.

A single LED making up an LED lamp has a manufacturing error such that its voltage drop Vf ranges from approximately 2.0 to 2.2V.

For example, if the power supply voltage Vcc in the normal state is 12V,
the voltage drop of the diode is 0.6V,
R is 13Ω, and
the voltage drop Vf occurring in the LED is 2.2V,
the current $I_0$ flowing through the left winker current line 54 in FIG. 2 is calculated as $$I_0 = 2 \text{ lines} \times \text{duty ratio } 0.625 \times \{Vcc - (Vf \times 4 \text{ LED's} + \text{voltage drop of the diode})\}/R$$

and is thus 0.25 A.

(Example of the Disconnection Map)

On the other hand, when there is a disconnection at one side of the LED lamps, one of the lines in the above formula is lost and the current $I_0$ flowing through the left winker current line 54 is halved.

Figure 5A:
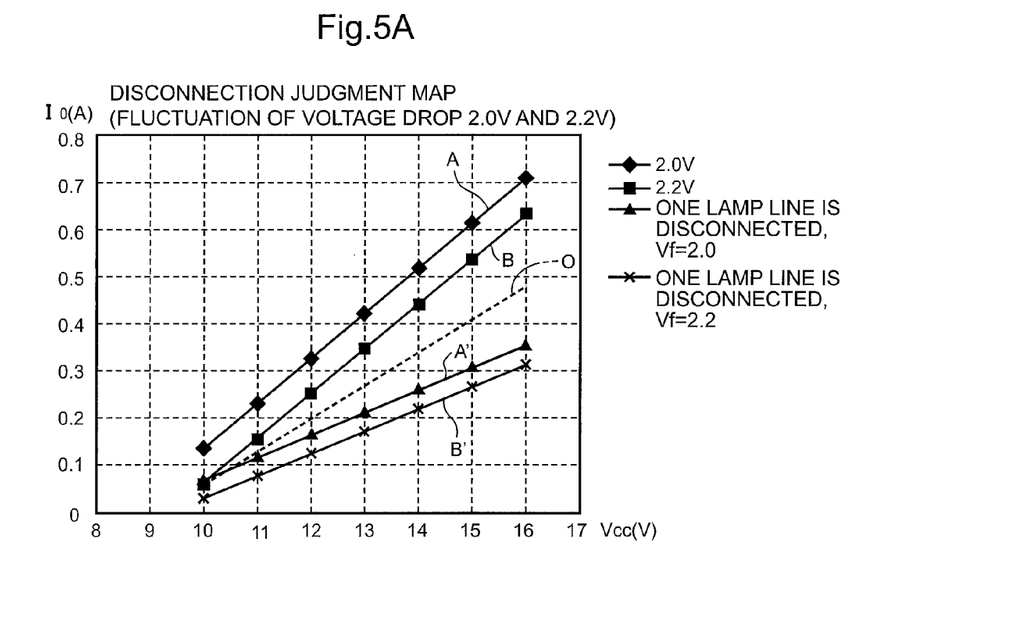

The graph of FIG. 5A shows plots of current values calculated for the case where there is no disconnection and the case where there is a disconnection in one line for the normal-state power supply voltage Vcc range of 10 to 12V for cases where the voltage drop of a single LED is 2.0V and 2.2V.

For the case where the voltage drop of a single LED is 2.0V, the current values in the normal state are indicated by a line A and the current values in the state where one lamp line is disconnected are indicated by a line A', for the case where the voltage drop of a single LED is 2.2V, the current values in the normal state are indicated by a line B and the current values in the state where one lamp line is disconnected are indicated by a line B', and therefore a disconnection judgment line O, indicated by a dotted line at a position intermediate the normal state and the disconnected state, can be set and the disconnection map can be prepared with which the values, corresponding to the disconnection judgment line O that vary with respect to the respective power supply voltages Vcc, are the disconnection abnormality determination values that serve as threshold values for judging whether or not there is a disconnection.

(Example of the Short-Circuit Map)

On the other hand, when there is a short circuit at one lamp among the LED lamps, the value of the current I that flows due to a single LED being short-circuited is calculated as follows as the current value of one of the lines in the above formula:

duty ratio 0.625×{Vcc−(Vf×(4−3 LED's)+voltage drop of the diode)}/R and is 0.2307 A.

The overall current $I_0$ for the two lines of the left winker that flows in the left winker current line 54 is thus $I_0$=0.125 (current of the one line in the normal state)+ 0.2307 (current when one lamp is short-circuited)

≈0.356 A

Figure 5B:
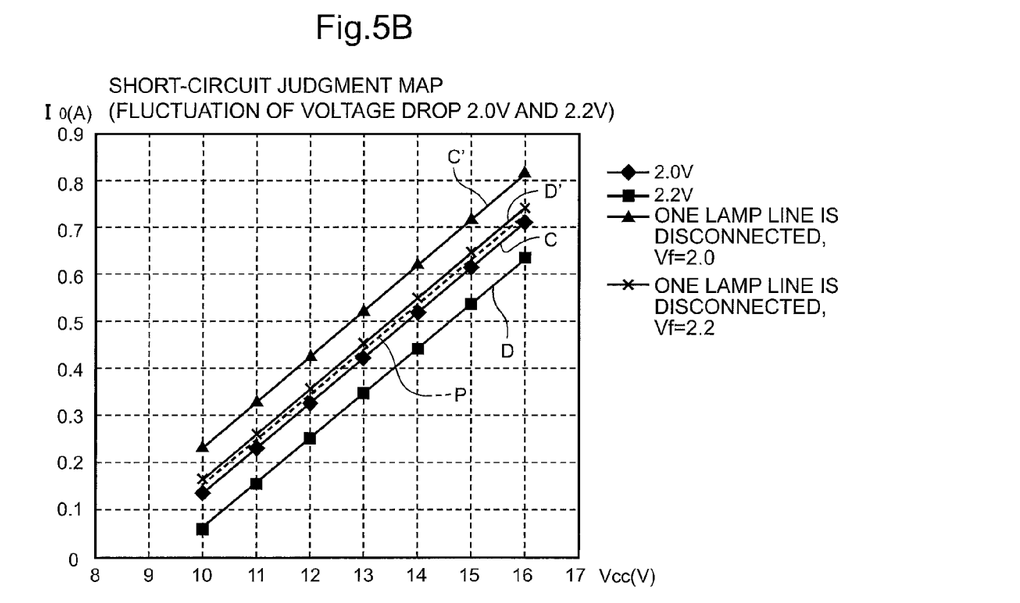

The graph of FIG. 5B shows plots of current values calculated for the case where there is no short circuit and the case where there is a short circuit in a single LED for the normal-state power supply voltage Vcc range of 10 to 12V for cases where the voltage drop of a single LED is 2.0V and 2.2V.

For the case where the voltage drop of a single LED is 2.0V, the current values in the normal state are indicated by a line C and the current values in the state where a single LED is short-circuited are indicated by a line C', for the case where the voltage drop of a single LED is 2.2V, the current values in the normal state are indicated by a line D and the current values in the state where a single LED is short-circuited are indicated by a line D', and therefore a short-circuit judgment line P, indicated by a dotted line at a position intermediate the normal state and the short-circuit state, can be set and the short-circuit map can be prepared with which the values, corresponding to the short-circuit judgment line P that vary with respect to the respective power supply voltages Vcc, are the short-circuit abnormality determination values that serve as threshold values for judging whether or not there is a short circuit.

Figure 6:
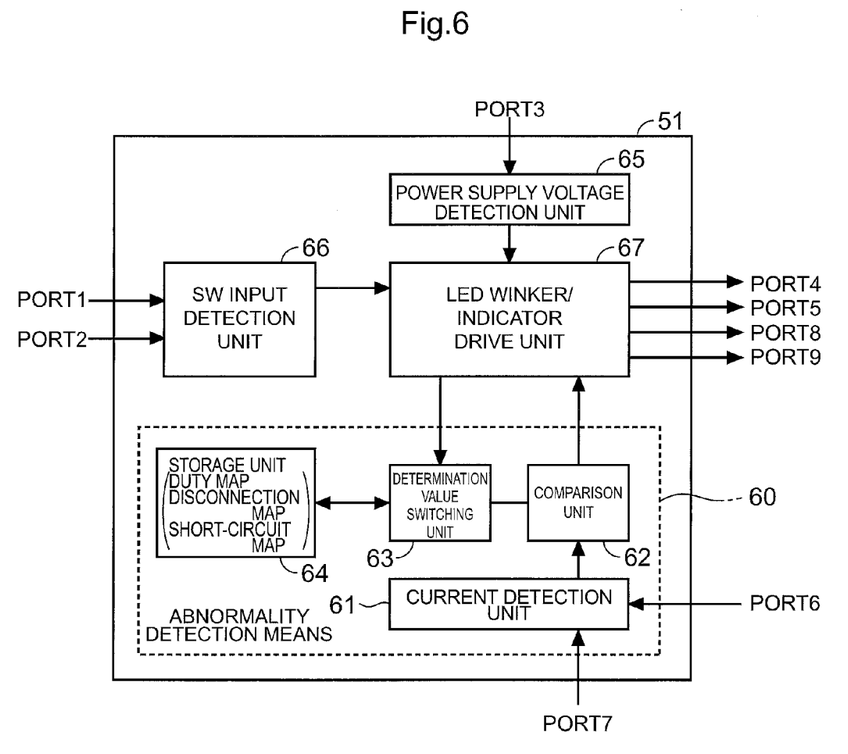
FIG. 6 is a block diagram of another example of a winker control unit.

An arrangement of another example of the winker control unit 51 for detecting an abnormality due to a disconnection or a short circuit in regard to the front winkers (LED lamps) 20 and the rear winkers (LED lamps) 30 shall now be described with reference to FIG. 6. In FIG. 6, portions adopting the same arrangements as those of FIG. 3 are provided with the same symbols.

Figure 3:
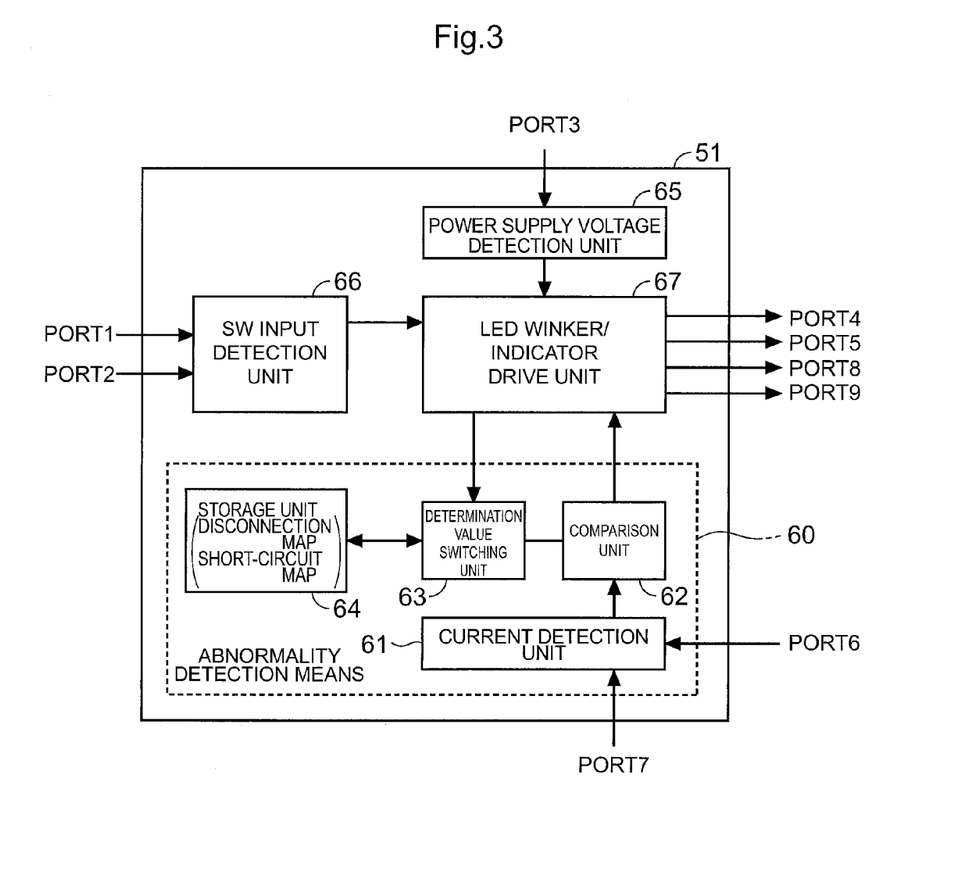
FIG. 3 is a block diagram of a winker control unit of the vehicle lighting device.

In contrast to the arrangement of FIG. 3, the winker control unit 51 of FIG. 6 is arranged with the LED winker/indicator drive unit (drive unit) 67 and the storage unit 64 being connected by a signal line so that in the LED winker/indicator drive unit (drive unit) 67, the duty ratio of the control signal can be set in accordance with the variation of the power supply voltage detected by the power supply voltage detection unit 65.

That is, with the example of FIG. 6, the duty ratio of the short pulse in the control signal (FIG. 4) output from the LED winker/indicator drive unit (drive unit) 67 is changed in accordance with the voltage (the power supply voltage Vcc applied to the LED lamps) detected by the power supply voltage detection means 65 via the port 3.

Correspondingly, a duty ratio map for setting the duty ratio of the drive signal output from the LED winker/indicator drive unit 67 is stored in the storage unit 64.

Figure 7:
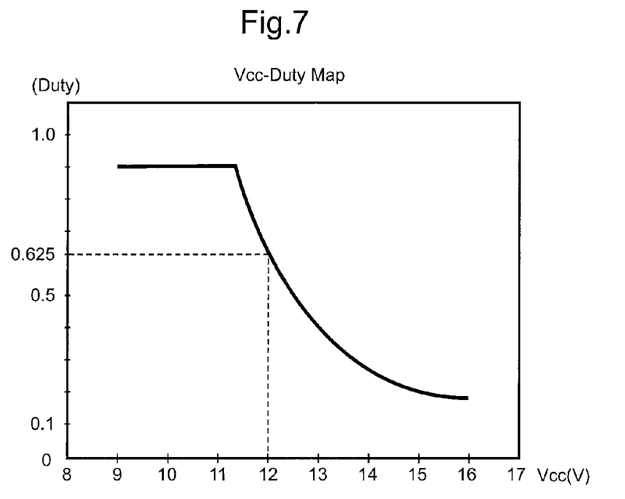
FIG. 7 is a graph for setting the duty ratio in the control signal.

As shown in FIG. 7, the duty ratio map is set so that the duty ratio of the short pulse decreases monotonously as the power supply voltage Vcc applied to the LED lamps 20 and 30 increase.

Specifically as shown in FIG. 7, when the power supply voltage Vcc increases as 10V, 11V, 12V, 13V, 14V, 15V, and 16V, the duty ratio is set to change as 0.99, 0.99, 0.625, 0.45, 0.35, 0.29, and 0.246.

The disconnection map stored in the storage unit 64 for setting the disconnection abnormality detection determination value and the short-circuit map for setting the short-circuit abnormality detection determination value in the case where the duty ratio of the short pulse making up the control signal changes shall now be described with reference to FIG. 8.

A single LED making up an LED lamp has a manufacturing error such that its voltage drop Vf ranges from approximately 2.0 to 2.2V.

For example, if the power supply voltage Vcc in the normal state is 12V, the voltage drop Vf occurring in the LED is 2.2V, the voltage drop of the diode is 0.6V, and R is 13Ω, the current $I_0$ flowing through the left winker current line 54 in FIG. 2 is calculated as $I_0$=2 lines×duty ratio×{Vcc−(Vf×4 LED's+voltage drop of the diode)}/R.

The duty ratio is the value calculated in accordance with the variation of the power supply voltage Vcc of FIG. 7.

(Example of the Disconnection Map)

On the other hand, when there is a disconnection at one side of the LED lamps, one of the lines in the above formula is lost and the current $I_0$ flowing through the left winker current line 54 is halved.

Figure 8A:
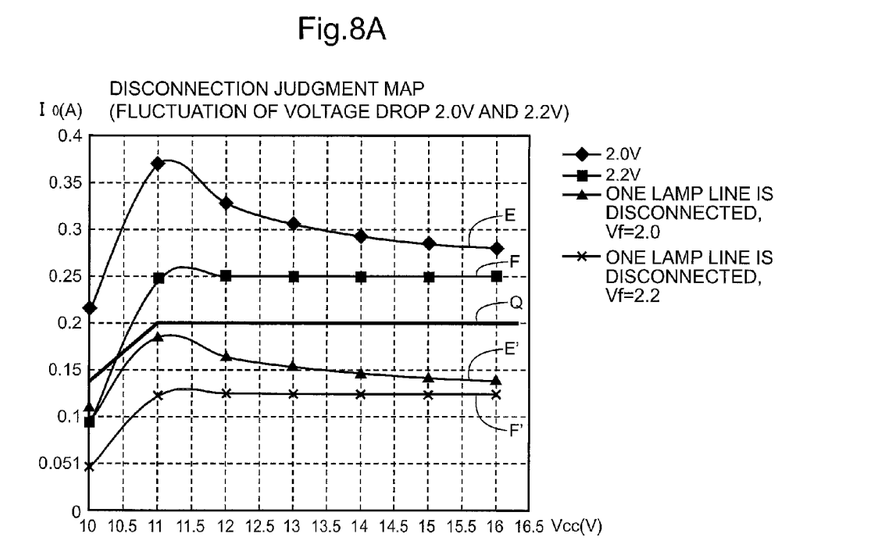

The graph of FIG. 8A shows plots of current values calculated for the case where there is no disconnection and the case where there is a disconnection in one line for the normal-state power supply voltage Vcc range of 10 to 12V for cases where the voltage drop of a single LED is 2.0V and 2.2V. In the case where the duty ratio of the short pulse making up the control signal is changed, it is possible to make the respective current values in the normal state and the disconnected state lie in substantially straight lines when the power supply voltage Vcc is no less than a certain value.

For the case where the voltage drop of a single LED is 2.0V, the current values in the normal state are indicated by a line E and the current values in the state where one lamp line is disconnected are indicated by a line E', for the case where the voltage drop of a single LED is 2.2V, the current values in the normal state are indicated by a line F and the current values in the state where one lamp line is disconnected are indicated by a line F', and therefore a disconnection judgment line Q, indicated by a dotted line at a position intermediate the normal state and the disconnected state, can be set. Consequently, the disconnection map can be prepared with which the values, corresponding to the disconnection judgment line Q that vary with respect to the respective power supply voltages Vcc, are the disconnection abnormality determination values that serve as threshold values for judging whether or not there is a disconnection.

In regard to the disconnection judgment line Q in the present example, the disconnection abnormality determination value (detection threshold current) is increased in accordance with the power supply voltage Vcc until Vcc becomes 11V and the disconnection abnormality determination value (detection threshold current) is fixed at 0.2 A when the power supply voltage Vcc is no less than 11V. With the disconnection judgment line Q, the output current $I_O$ is 0.2 A when the Vcc is 11V, the output current $I_O$ is 0.14 A when the Vcc is 10V, and therefore the output current $I_O$ (A) can be expressed as 0.06 Vcc-0.46 with the Vcc as a variable.

By varying the duty ratio of the short pulse making up the control signal, the differences of the normal state and the disconnected state with respect to the disconnection judgment line Q can be made large even when the power supply voltage Vcc varies, thereby enabling the detection threshold current to be set as the disconnection abnormality determination value even more readily and to be set to a fixed value when the power supply voltage Vcc is no less than a certain value.

(Example of the Short-Circuit Map)

On the other hand when there is a short circuit at one lamp among the LED lamps, the value of the current I that flows due to a single LED being short-circuited is calculated as follows as the current value of one of the lines in the above formula:

$$\text{duty ratio} \times \{Vcc-(Vf\times(4-3\text{ LED's})+\text{voltage drop of the diode})\}/R$$

The value of the overall current $I_O$ for the two lines of the left winker that flows in the left winker current line 54 is as follows.

$$I_O = \text{(current flowing in one line in the normal state)} + \text{(current flowing when one lamp is short-circuited)}$$

Figure 8B:
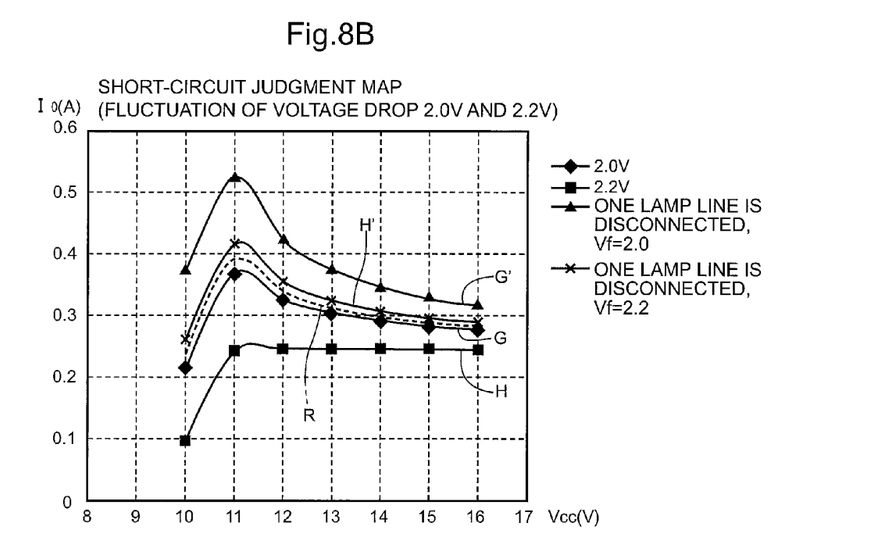

The graph of FIG. 8B shows plots of current values calculated for the case where there is no short circuit and the case where there is a short circuit in a single LED for the normal-state power supply voltage Vcc range of 10 to 12V for cases where the voltage drop of a single LED is 2.0V and 2.2V.

For the case where the voltage drop of a single LED is 2.0V, the current values in the normal state are indicated by a line G and the current values in the state where a single LED is short-circuited are indicated by a line G', for the case where the voltage drop of a single LED is 2.2V, the current values in the normal state are indicated by a line H and the current values in the state where a single LED is short-circuited are indicated by a line H', and therefore a short-circuit judgment line R, indicated by a dotted line at a position intermediate the normal state and the short-circuit state, can be set and the short-circuit map can be prepared with which the values, corresponding to the short-circuit judgment line R that vary with respect to the respective power supply voltages Vcc, are the short-circuit abnormality determination values that serve as threshold values for judging whether or not there is a short circuit.

By varying the duty ratio of the short pulse making up the control signal, the current value of the winker current line is suppressed from becoming high in accordance with the increase of the power supply voltage Vcc as shown in FIG. 8B and flowing of a high current can be suppressed even when a short circuit occurs.

Although in the short-circuit abnormality detection by the abnormality detection means 60 in the respective examples described above, the abnormality judgment was made by the abnormality determination value (the current value that is to be the threshold) set using the short-circuit map in accordance with the power supply voltage Vcc applied to the LED lamps, arrangements may be made to use this value as a first abnormality determination value and to set a second abnormality determination value that is greater than the first abnormality determination value and is a fixed value to thereby detect a short-circuit state in a stepwise manner.

That is, by judging a short circuit by the second abnormality determination value, which is a fixed value, before judging by the first abnormality determination value, a case where the short-circuit current value is large and there are many short-circuit locations can be detected. By performing short-circuit detection by the first abnormality determination value and the second abnormality determination value, the LED lamps 20 and 30 and the indicators 58 and 59 are driven with the blinking cycle being quickened in comparison to the blinking cycle of the normal state when the detected current value is greater than the first abnormality determination value and less than the second abnormality determination value, and control where the LED lamps 20 and 30 are unlit and the indicators 58 and 59 are driven with the blinking cycle being quickened in comparison to the blinking cycle of the normal state is performed when the detected current value is greater than the second abnormality determination value.

Figure 9:
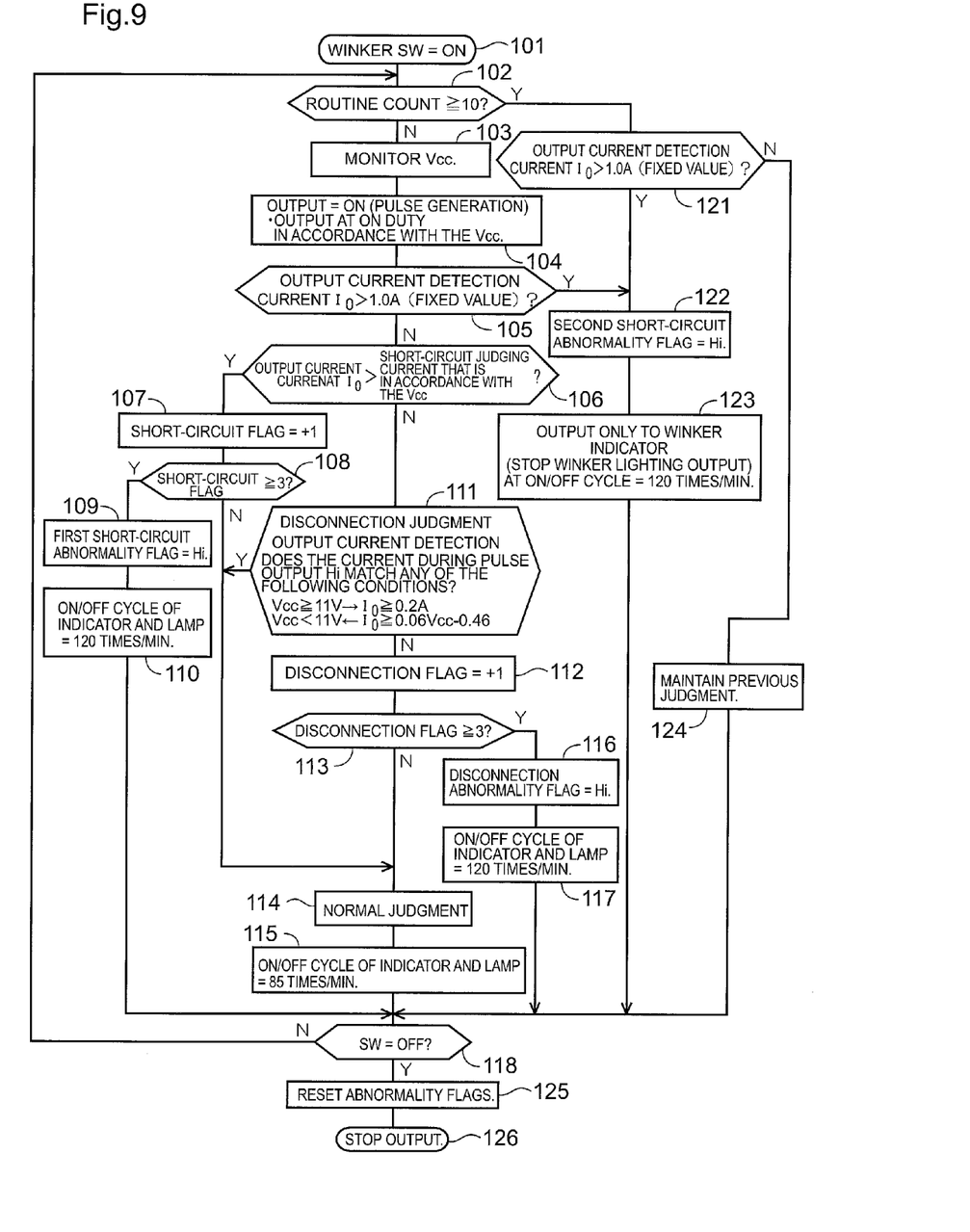
FIG. 9 is a flowchart for performing an abnormality detection process in the vehicle lighting device.

A procedure for performing the abnormality detection process of the vehicle lighting device according to the present invention shall now be described with reference to the flowchart of FIG. 9. With the flowchart of FIG. 9, an example shall be described where, in the abnormality detection means 60 of the winker control unit 51, the duty ratio of the control signal is set in accordance with the power supply voltage Vcc and a short circuit is detected using the first abnormality determination value and the second abnormality determination value in the short-circuit detection (an example with which the arrangement of the abnormality detection means 60 corresponds to the block diagram of FIG. 6).

When the winker switch 46 is operated, the SW input detection unit 66 detects the input signal and in accordance with the detection result, the LED winker/indicator drive unit 67 judges which of the right and left LED lamps are to be lit (step 101). Thereafter, whether or not a routine count is no less than 10 is judged (step 102).

If the routine count is less than 10, the power supply voltage Vcc is detected at the power supply voltage detection unit 65 (step 103) and the control signal is output from the winker control unit 51 to the FET 55 or the FET 57 (step 104).

The duty ratio of the on output of the control signal is set from the duty ratio map of FIG. 6 in accordance with the power supply voltage Vcc detected at the power supply voltage detection unit 65 (step 104).

For example, if the left side is selected by the winker switch 46, the control signal is output to the FET 55 to make the left front winker 20 (L-side FR) and rear winker 30 (L-side RR) blink, and by the FET 55 being made to perform the on/off operation by the pulses of the control signal, the power supply voltage Vcc is applied to the front winker 20 (L-side FR) and rear winker 30 (L-side RR) to put these in the blinking state.

When the power supply voltage Vcc is applied to the front winker 20 (L-side FR) and rear winker 30 (L-side RR) and these are put in the blinking state, the disconnection and short-circuit detection process is performed. That is, whether or not there is an abnormality is judged in accordance with the timing of the on state of the pulse signal, which is the timing at which the LED lamps (20, 30) are lit, and since the judgment of whether or not there is an abnormality can be made at the same time as when the lamps are being driven, there is no need to judge whether or not there is an abnormality in the unlit state and wasteful consumption of power can thus be prevented.

When the power supply voltage Vcc is applied to the front winker 20 (L-side FR) and rear winker 30 (L-side RR) and these are put in the blinking state, first the abnormality detection regarding whether or not there is a short circuit is performed.

The output current $I_O$ flowing through the winker current line 54 is detected by the current detection unit 61 and compared with a fixed current value (the second abnormality determination value greater than the first abnormality determination value to be described below; for example, 1.0 (A)) for short-circuit abnormality detection (detection for the case where the short-circuit current is large) at the comparison unit 62 (step 105).

The current detection unit 61 detects the current value at the timing at which the first short pulse, among the plurality of short pulses in the first on state of the pulse signal output in accordance with the drive operation of the LED lamps, is on. Also, the current detection unit 61 detects the current value at timings at which a predetermined number of short pulses, including the first short pulse, are on.

If the output current $I_O$ is no more than the fixed current value (second abnormality determination value) for short-circuit abnormality detection, the output current $I_O$ is compared with a current value (first abnormality determination value) for short-circuit abnormality detection (detection for the case where the short-circuit current is small, as when a single lamp is short-circuited) that is in accordance with the power supply voltage Vcc (step 106). As the first abnormality determination value, a value, set using the short-circuit map, stored in the storage unit 64, based on the power supply voltage Vcc detected at the power supply voltage detection unit 65, is used.

If the output current $I_O$ exceeds the current value (first abnormality determination value) for short-circuit abnormality detection, it is judged that there is a short-circuit abnormality and "1" is added to a short-circuit flag count (step 107). Thereafter, whether or not the short-circuit flag count is no less than "3" is judged (step 108). The abnormality detection judgment is suspended until the short-circuit flag count becomes no less than "3" to insure the reliability of the abnormality judgment.

If the short-circuit flag count is no less than "3," a first short-circuit abnormality flag is set to "Hi" (step 109) and the indicator 59 and the LED lamps 20 (L-side FR) and 30 (L-side RR) are respectively driven at an on/off cycle of 120 times/minute by the LED winker/indicator drive unit 67 (step 110). That is, a short-circuit flag of "1" corresponds to a single short pulse.

Thereafter, abnormality detection of whether or not there is a disconnection is performed.

The output current $I_O$ flowing through the winker current line 54 is compared with a disconnection detection current value set by the determination value switching unit 63. The disconnection detection current value is set based on the disconnection map of FIG. 8A that is stored in the storage unit 64 and therefore when the Vcc is no less than 11V, the judgment is made based on whether or not the output current $I_O$ is no less than 0.2 (A), and when the Vcc is less than 11V, the judgment is made based on whether or not the output current $I_O$ is no less than 0.06 Vcc-0.46 (A), with the Vcc being a variable.

If the output current $I_O$ is less than the disconnection detection current value, it is judged that there is a disconnection abnormality and "1" is added to a disconnection flag count (step 112). Thereafter, it is determined whether or not the disconnection flag count is no less than "3" (step 113) and if the disconnection flag count is no less than "3," a disconnection abnormality flag is set to "Hi" (step 116) and the indicator 58 and the LED lamps 20 (L-side FR) and 30 (L-side RR) are respectively driven at an on/off cycle of 120 times/minute by the LED winker/indicator drive unit 67 (step 117).

If in step 113, the disconnection flag count is no more than "2," it is judged that the state is normal (step 114) and the indicator 58 and the LED lamps 20 (L-side FR) and 30 (L-side RR) are respectively driven at an on/off cycle of 85 times/minute by the LED winker/indicator drive unit 67 (step 115).

Also when the short-circuit flag count is no more than "2" in step 108 for performing the short-circuit abnormality detection, it is judged that the state is normal (step 114) and the indicator 58 and the LED lamps 20 (L-side FR) and 30 (L-side RR) are respectively driven at an on/off cycle of 85 times/minute by the LED winker/indicator drive unit 67 (step 115).

If the routine count at step 102 is no less than 10, it is only judged whether or not the peak current value of the output current $I_O$ is greater than 1.0 (A) (step 121), and if the output current $I_O$ is greater than the fixed value of 1.0 A, it is judged that a large current is flowing due to short circuit at all lamps, etc., and a second short-circuit abnormality flag is set to "Hi" (step 122), the lighting of the LED lamps 20 (L-side FR) and 30 (L-side RR) by the control signal of the LED winker/indicator drive unit 67 is interrupted (stoppage of winker lighting output) and blinking drive of only the indicator 59 for blinking when the left winker is selected is performed at an on/off cycle of 120 times/minute (step 123). That is, the driving of the indicator 59 by the LED winker/indicator drive unit 67 and the driving of the LED lamps 20 and 30 can be performed in separate lines and it is thus possible to perform blinking drive of just the indicator 59 with the LED lamps being unlit.

Similarly, when in step 105, the output current $I_O$ is greater than the fixed current value (second abnormality determination value) for short-circuit abnormality detection, it is judged that a large current is flowing due to short circuit at all lamps, etc., and the second short-circuit abnormality flag is set to "Hi" (step 122), the lighting of the LED lamps 20 (L-side FR) and 30 (L-side RR) by the control signal of the LED winker/indicator drive unit 67 is interrupted (stoppage of winker lighting output) and blinking drive of only the indicator 59 for blinking when the left winker is selected is performed at an on/off cycle of 120 times/minute (step 123).

Thereafter, on/off of the main switch 42 is judged (step 118) and if the switch is in the on state, the process of step 102 (judgment of whether or not the routine count is no less than 10) is performed, while if the switch is off, resetting of the abnormality flags (first short-circuit abnormality flag, second short-circuit abnormality flag, and disconnection abnormality flag) is performed (step 125) and output stoppage of the drive output from the winker control unit 51 (LED winker/indicator drive unit 67) is performed (step 126).

Although in the above description, the case where the left winker is selected by the winker switch 46 was described, the same process is performed for the LED lamps 20 (R-side FR) and 30 (R-side RR) and the indicator 58 that blinks when the right winker is selected when the right winker is selected by the winker switch 46.

REFERENCE SIGNS LIST

1: motorcycle,
9: headlight,
14: power unit,
18: ACG starter motor (generator),
19: battery,
20: front winkers (LED lamps),
30: rear winkers (LED lamps),
31: tail lamp,
40: ECU, 42: main switch,
46: winker switch,
50: meter unit,
51: winker control unit (drive control means),
52: supply voltage adjustment unit,
53: power supply line,
54: left winker current line,
56: right winker current line,
55, 57: FET,
58, 59: indicator,
60: abnormality detection means,
61: current detection unit,
62: comparison unit,
63: determination value switching unit,
64: storage unit,
65: power supply voltage detection unit,
66: SW input detection unit,
67: LED winker/indicator drive unit (drive control means)

The invention claimed is:

1. A vehicle LED lighting device comprising:
　a drive controller configured to perform drive control of an LED lamp installed in a vehicle and comprising:
　　an abnormality detector configured to detect a disconnection abnormality or a short-circuit abnormality of the LED lamp and comprising:
　　　a current detector configured to detect a current value of a current flowing through the LED lamp when the LED lamp is driven by the drive controller:
　　　a comparison device configured to compare the current value detected by the current detector with a predetermined abnormality determination value, the predetermined abnormality determination value including an abnormality determination value for disconnection detection and an abnormality determination value for short-circuit detection; and
　　　a determination value changing device configured to change the predetermined abnormality determination value in accordance with variation of a power supply voltage of the vehicle,
　wherein whether or not there is the disconnection abnormality or the short-circuit abnormality is judged based on the predetermined abnormality determination value changed by the determination value changing device and the current value detected by the current detector,
　wherein the abnormality determination value for disconnection detection is changeable in accordance with the power supply voltage applied to the LED lamp, and
　wherein the abnormality determination value for short-circuit detection includes a first abnormality determination value that is changeable in accordance with the power supply voltage applied to the LED lamp and a second abnormality determination value that is greater than the first abnormality determination value and is a fixed value.

2. The vehicle LED lighting device according to claim 1, wherein the drive controller includes a drive device which, when a drive operation of the LED lamp is performed by a driver, outputs a pulse signal that is in accordance with the power supply voltage and drives the LED lamp to blink in a manner such that the LED lamp is in a lit state when the pulse signal is in an on state, and
　wherein the current detector detects the current value when the pulse signal is in the on state.

3. The vehicle LED lighting device according to claim 2, wherein the on state of the pulse signal is arranged from a duster of a plurality of short pulses that are set to a predetermined duty ratio, and
　wherein the current detector detects the current value at a timing at which a first short pulse, among the plurality of short pulses in a first on state of the pulse signal output in accordance with the drive operation of the LED lamp, is on.

4. The vehicle LED lighting device according to claim 3, wherein the current detector detects the current value at timings at which a predetermined number of short pulses including the first short pulse are on.

5. The vehicle LED lighting device according to claim 3, wherein the drive device changes the predetermined duty ratio of the plurality of short pulses in accordance with the power supply voltage applied to the LED lamp.

6. The vehicle LED lighting device according to claim 5, wherein the predetermined duty ratio of the plurality of short pulses is set to decrease as the power supply voltage applied to the LED lamp increases.

7. The vehicle LED lighting device according to claim 1, further comprising:
　an indicator display device configured to blink in accordance with a blinking state of the LED lamp and provided inside a meter,
　wherein the LED lamp and the indicator display device are connected to the drive controller through separate lines.

8. The vehicle LED lighting device according to claim 7, wherein the indicator display device configured to blink in accordance with the blinking state of the LED lamp is formed inside a meter of the vehicle,
　wherein the LED lamp and the indicator display device are driven with a blinking cycle quickened in comparison to a blinking cycle in the normal state when the current value detected by the current detector is greater than the first abnormality determination value and less than the second abnormality determination value, and
　wherein the LED lamp is unlit and the indicator display device is driven with a blinking cycle quickened in comparison to a blinking cycle in the normal state when the current value detected by the current detector is greater than the second abnormality determination value.

9. The vehicle LED lighting device according to claim 1, wherein the LED lamp includes a plurality of diodes connected in series.

10. The vehicle LED lighting device according to claim 1, wherein abnormality detector performs short-circuit abnormality judgment before performing disconnection abnormality judgment.

\* \* \* \* \*